(12) United States Patent
Gray et al.

(10) Patent No.: US 6,801,324 B1
(45) Date of Patent: Oct. 5, 2004

(54) INTERFEROMETER CONTROL AND LASER FREQUENCY LOCKING

(75) Inventors: Malcolm Bruce Gray, Scullin (AU); Daniel Anthony Shaddock, Kaleen (AU)

(73) Assignee: The Australian National University (AU)

(*) Notice: Subject to any disclaimer, the term of this patent is extended or adjusted under 35 U.S.C. 154(b) by 60 days.

(21) Appl. No.: 10/018,958

(22) PCT Filed: Jun. 30, 2000

(86) PCT No.: PCT/AU00/00739
§ 371 (c)(1),
(2), (4) Date: May 29, 2002

(87) PCT Pub. No.: WO01/03258
PCT Pub. Date: Jan. 11, 2001

(30) Foreign Application Priority Data

Jun. 30, 1999 (AU) .............................. PQ1292

(51) Int. Cl.$^7$ .............................. G01B 9/02; H01S 3/13; H01S 3/083
(52) U.S. Cl. .............................. 356/519; 372/32; 372/94
(58) Field of Search .............................. 356/519, 450; 372/32, 94

(56) References Cited

U.S. PATENT DOCUMENTS

| | | |
|---|---|---|
| 4,451,923 A | 5/1984 | Hansch et al. |
| 4,674,091 A | 6/1987 | Colson |
| 5,412,676 A * | 5/1995 | Schnier et al. ................. 372/32 |
| 5,432,606 A | 7/1995 | Noguchi et al. |

OTHER PUBLICATIONS

Wieman et al., Laser–frequency stabilization using mode interference from a reflecting reference interferometer, Opt. Lett., vol. 7, No. 10, pp. 480–482 (1982) Figure 2, abstract, p. 482 col. 1, par. 4.

* cited by examiner

Primary Examiner—Samuel A. Turner
Assistant Examiner—Patrick Connolly
(74) Attorney, Agent, or Firm—Nixon Peabody LLP; Donald R. Studebaker (57) ABSTRACT

This invention provides a method and an optical system for sensing and controlling the frequency for a laser with respect to an optical cavity and for sensing and controlling the length difference of interferometer paths in a two beam interferometer. A misalignment is introduced in the incident laser radiation to produce a fundamental mode (TEM00) in the cavity or interferometer and the reflection of a least one higher order mode (TEM01). A split photodetector (10) allows the interference between these two modes to be measured separately by detecting two spatially distinct portions of the single reflected beam. An error signal indicative of the difference between the fundamental mode frequency and the cavity resonant frequency is obtained by substracting the outputs from the two parts of the photodetector.

24 Claims, 9 Drawing Sheets

INTERFEROMETER CONTROL AND LASER FREQUENCY LOCKING

FIELD OF THE INVENTION

This invention relates to a method for producing an error signal for the sensing and control of optical interferometers.

BACKGROUND ART

Interferometer sensing and control is required for a broad range of scientific and industrial applications. Examples include the frequency stabilisation of diode lasers for fibre optic communication systems, CW wavelength conversion for use in laser printing and photolithographic processes, coherent LIDAR, laser based gyroscope position measuring, remote vibrometry and displacement sensing. The most common approach relies on phase modulation (PM) of the incident laser beam. For multiple beam interferometers, such as the Fabry-Perot interferometer, the Pound-Drever-Hall (PDH) technique is commonly used. This technique has been utilised over the last two decades and when used with high finesse cavities is capable of achieving sub-hertz laser line widths. The PDH modulation frequency is chosen so that the sidebands are non-resonant in the cavity when the carrier field is near resonance. The sidebands are reflected from the cavity with essentially no phase shift The carrier however is near resonance and experiences the full dispersion of the cavity resonance upon reflection. The respective phase shift between the carrier and the sidebands changes the PM symmetry of the incident field introducing some component of amplitude modulation (AM) to the reflected field. As the laser frequency passes through resonance the sign of the AM changes resulting in a zero crossing error signal when the reflected field is detected and demodulated. There are several inherent disadvantages with this PM modulation technique. Firstly the implementation of this technique is complex and expensive. Additionally parasitic AM from the electro-optic modulator can cause significant locking error to occur at time scales of several seconds and longer. The error signal produced at the demodulator output is also typically quite small and consequently the system requires a large gain. Additionally, the small error signal makes the system susceptible to low frequency electronic noise generated within the servo controller for laser frequency.

A prior art approach to laser frequency stabilisation is described in U.S. Pat. No. 4,451,923. The technique described in this patent is based on the interference of polarisation modes. The polarisation interferences are measured by splitting the beam reflected from the cavity through a polarising beam splitter, after passage through some waveplates, and then detecting the respective components of the beam with separate photodetectors. The subtracted outputs from the photodetectors is used to generate an error signal.

U.S. Pat. No. 5,412,676 discloses a method and apparatus for the determination of the relative frequency offset between an input optical signal and a resonance frequency of an optical cavity. The technique described requires a nearly confocal cavity to be used. Additionally, two photodetectors are required each with some form of associated aperture to produce outputs that are subtracted to form an error signal. Another feature of this approach is that the beam transmitted through the cavity is analysed which can result in additional optical phase shift for the error signal in high finesse cavities operating at high frequencies.

Another prior art approach to frequency stabilisation is described by C E Wiemann and S L Gilbert "Laser frequency stabilisation using mode interference from a reflecting interferometer" Opt. Lett. Vol. 7, 10, page 480–483, (1982). The technique described in this paper requires the beam reflected from the cavity to be divided by a beam splitter and detected on to photodetectors. One of these detectors has an aperture or diaphragm and the second uses a variable attenuator. This technique can suffer from an intrinsic lack of sensitivity and changes of attenuation or the beam radius may also introduce frequency stabilisation errors.

DISCLOSURE OF THE INVENTION

The present invention proceeds from the recognition that a misaligned mode of an interferometer can be used to act as a phase reference for the correctly aligned fundamental mode of the interferometer. The interference between these two modes is capable of producing an error signal indicative of the phase component the correctly aligned fundamental mode.

In the case of a two beam interferometer, including, but not limited to, a Michelson, Sagnac or Mach-Zehnder interferometer, this error signal is indicative of the phase difference of the two beams, thus allowing the sensing and control of the length difference of the interferometer paths. In the case of a multiple beam interferometer, such as a Fabry-Perot interferometer, this error signal is indicative of the difference between the fundamental mode frequency and the interferometer resonance frequency thus allowing control of the laser frequency with respect to the interferometer resonance frequency.

Accordingly, in one aspect this invention provides a method for sensing and controlling the frequency of a laser with respect to an optical cavity including the steps of introducing a misalignment in the incident laser radiation to the cavity to produce oscillation in the cavity of substantially only a TEM00 mode and a TEM01 mode, and detecting at least two spatially distinct portions of a single beam reflected from the cavity to produce at least two signals each indicative of the respective interference of the two correspondingly spatially distinct portions of the TEM00 mode with two correspondingly spatially distinct portions of the TEM01 mode, and producing an error signal indicative of the difference between the TEM00 mode frequency and the cavity resonance frequency from the signals.

In a second aspect, this invention provides a method for sensing and controlling a two beam interferometer such that the relative path length of the two beams is fixed, including the steps of introducing a misalignment between the two beams to produce substantially only a TEM00 mode and a TEM01 mode, detecting at least two spatially distinct portions of a single beam directed from the interferometer to produce at least two signals each indicative of the interference of the correspondingly spatially distinct portions of the TEM00 mode with the correspondingly spatially distinct portions of the TEM01 mode, and producing an error signal indicative of the path length difference for the TEM00 modes from the signals.

In a third aspect this invention provides an optical system for controlling the frequency of a laser, said system including an optical cavity, means to direct laser radiation into said cavity, means to introduce a misalignment in the incident laser radiation to the cavity to produce oscillation in the cavity of substantially only a TEM00 mode and a TEM01 mode, and means to detect at least two spatially distinct portions of a single beam reflected from the cavity to produce at least two signals each indicative of the respective interference of the two correspondingly spatially distinct portions of the TEM00 mode with two correspondingly spatially distinct portions of the TEM01 mode, and produce an error signal indicative of the difference between the TEM00 mode frequency and the cavity resonance frequency from the signals.

In a fourth aspect this invention provides a two beam interferometer including means to introduce a misalignment between the two beams to produce substantially only a TEM00 mode and a TEM01 mode, means to detect at least two spatially distinct portions of a single beam directed from the interferometer and produce at least two signals each indicative of the interference of the correspondingly spatially distinct portions of the TEM00 mode with the correspondingly spatially distinct portions of the TEM01 mode, and means to produce from said two signals an error signal indicative of the path length difference for the TEM00 modes from the signals.

Preferably, two spatially distinct portions of the beam are detected and they are preferably of equal size. More preferably each form about one half of the cross section of the beam. In the preferred form of the invention the detector is a single entity split into two detecting portions that provide separate outputs.

Preferably the misalignment is generated by tilt or angling the beams. However, it may be more convenient in some interferometer configurations to utilise offset misalignment. Offset misalignment can produce an identical error signal to that produced from tilt misalignment by situating a lens in front of the photodetector. The lens is positioned relative to the detector in such a way that beam offset at the interferometer output is converted into beam tilt at the photodetector.

In the preferred form of the invention the two signals can be directly electronically subtracted to directly provide the error signal.

It will be apparent that the error signal generated in accordance with this invention is used to drive either interferometer control or laser frequency control in the known manner, or as a signal readout of the interferometer.

It will also be apparent that in the case of a multiple beam interferometer in common with the PDH system the method of the present invention utilises a nonresonant field as a phase reference however the field is generated not by modulation but by a simple misalignment of the incident field.

Some embodiments of the invention will now be described, by way of example, with reference to the accompanying drawings.

DESCRIPTION OF THE DRAWINGS

FIG. 5(c) graphically illustrates parasitic amplitude modulation at the mixer output of a PDH frequency locking system.

BEST MODES FOR CARRYING OUT THE INVENTION

It will be appreciated that in one application the present invention relates to a laser system that utilises a passive optical cavity of selected resonant frequency as the means of providing frequency stabilisation. As indicated above systems of this type are generally known and share the common feature of the generation of an error signal representative of the deviation of the laser output from the resonant frequency of the cavity which is used to drive frequency control of the laser. The known components of this system do not form part of the present invention and therefore will not be described in further detail.

Figure 1:
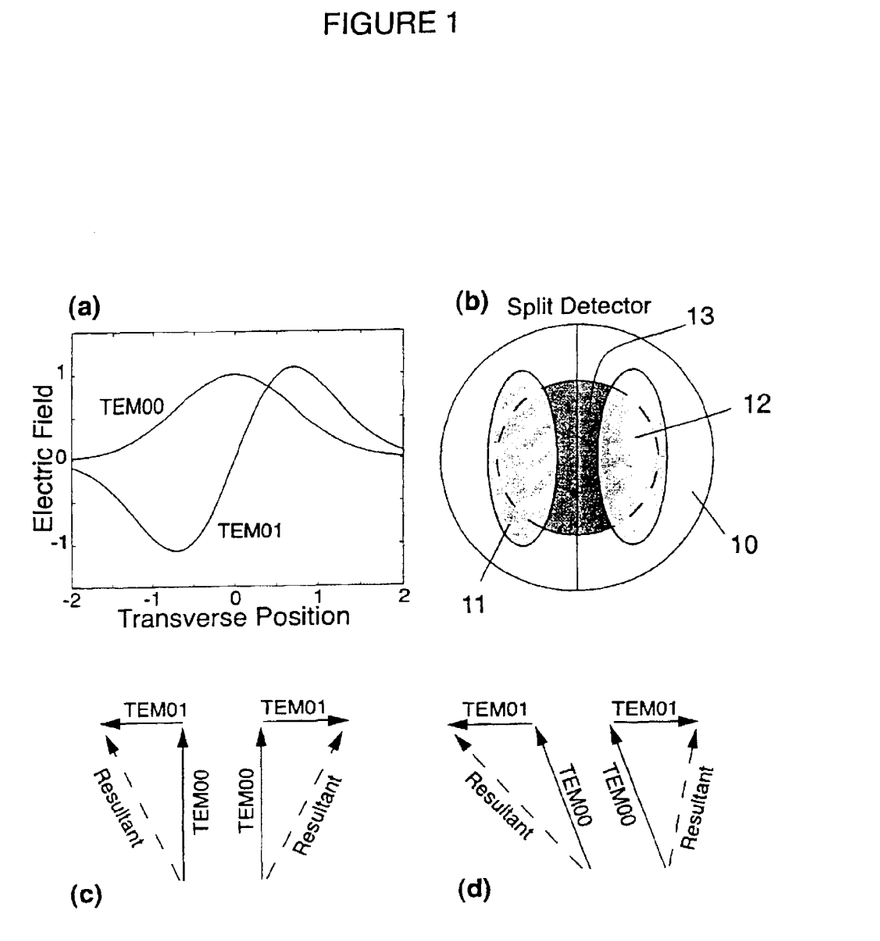
FIG. 1(a) illustrates the magnitude of the transverse electric field of the TEM00 and TEM01 interferometer modes.
FIG. 1(b) diagrammatically illustrates the intensity distributions of the TEM00 (dark circle) and TEM01 (light ellipses) impinging on a split photo detector.
FIG. 1(c) illustrates the vector summation of electric fields for the two halves of a split detector with the TEM00 mode on resonance.
FIG. 1(d) illustrates the vector summation of electric fields for the two halves of a split detector with the TEM00 mode slightly off resonance.

The present invention utilises a non-resonant field generated by misalignment of the incident field as a phase reference. In general a cavity breaks down a misaligned input field into spatially distinct Hermite-Gauss cavity modes. Higher order Hermite-Gauss modes experience different Gouy phase shifts and thus have different resonant frequencies. For tilt locking the input beam is aligned and mode matched to give only the TEM00 (fundamental) mode and the TEM01 (misalignment) mode. The transverse electric field distribution for both modes is shown in FIG. 1(a). The TEM01 mode has a double hump intensity distribution whilst the TEM00 mode exhibits a simple Gaussian intensity profile. The reflected beam is detected on a two element split photodetector 10 as shown in FIG. 1(b) in such a way that each hump 11, 12 of the TEM01 mode falls in a separate half of the photodetector. The split detector allows the interference between the fundamental TEM00 mode 13 and each individual TEM01 mode hump 11, 12 to be measured separately. The TEM01 mode arises from two types of misalignment: beam displacement and beam tilt. Beam displacement produces a TEM01 higher order mode which has a zero phase shift in one half plane and a $7r$ phase shift in the other. Beam tilt however produces a TEM01 mode which has $\pi/2$ phase shift in one half plane and a $-\pi/2$ in the other. FIG. 1(c) shows the corresponding electric field vector addition of the TEM00 and tilt TEM01 modes on the two halves of the photodetector when there is no phase shift added by the cavity. This corresponds to the TEM00 mode being exactly resonant with the cavity and the TEM01 being non-resonant. On the left half the TEM01 adds to the TEM00 mode with $-\pi/2$ phase while on the right half, the TEM01 adds with $+\pi/2$ phase. The resultant vectors on both halves are then equal in magnitude. An error signal is obtained by subtracting the outputs from the two halves of the photodetector which in this case gives zero. As the carrier drifts slightly away from resonance, the TEM00 mode acquires an equal phase shift in both photodetector halves while the non-resonant TEM01 mode remains unchanged as shown in FIG. 1(d). This causes the resultant vector sum in one photodiode half to grow whilst the other shrinks. The electronically subtracted error signal is now non zero and is proportional to the phase shift of the TEM00 fundamental mode.

FIGS. 2(a) and 2(b) show two experimental arrangements using the locking technique of this invention. The arrangement shown in FIG. 2(a) includes a laser 15 of a known type which is to be frequency controlled or frequency "locked". The output of the laser is directed via two alignment mirrors 16, 17 to an optical cavity 18 formed by mirror 19 and two partially transmitting mirrors 20 and 21. The stabilised output is transmitted via mirror 20. The beam reflected from mirror 19 and transmitted via mirror 21 is directed on to a split detector 22 as described above in relation to FIG. 1. An error signal is obtained by subtracting the outputs of the two halves of the detector 22 schematically illustrated at 23. The signal is amplified at 24 and used as the frequency controlling input for the laser 15. It will be apparent that in the arrangement shown in FIG. 2(a) the error signal is the light measured directly from the cavity with a slightly tilted or misaligned input beam.

Figure 2:
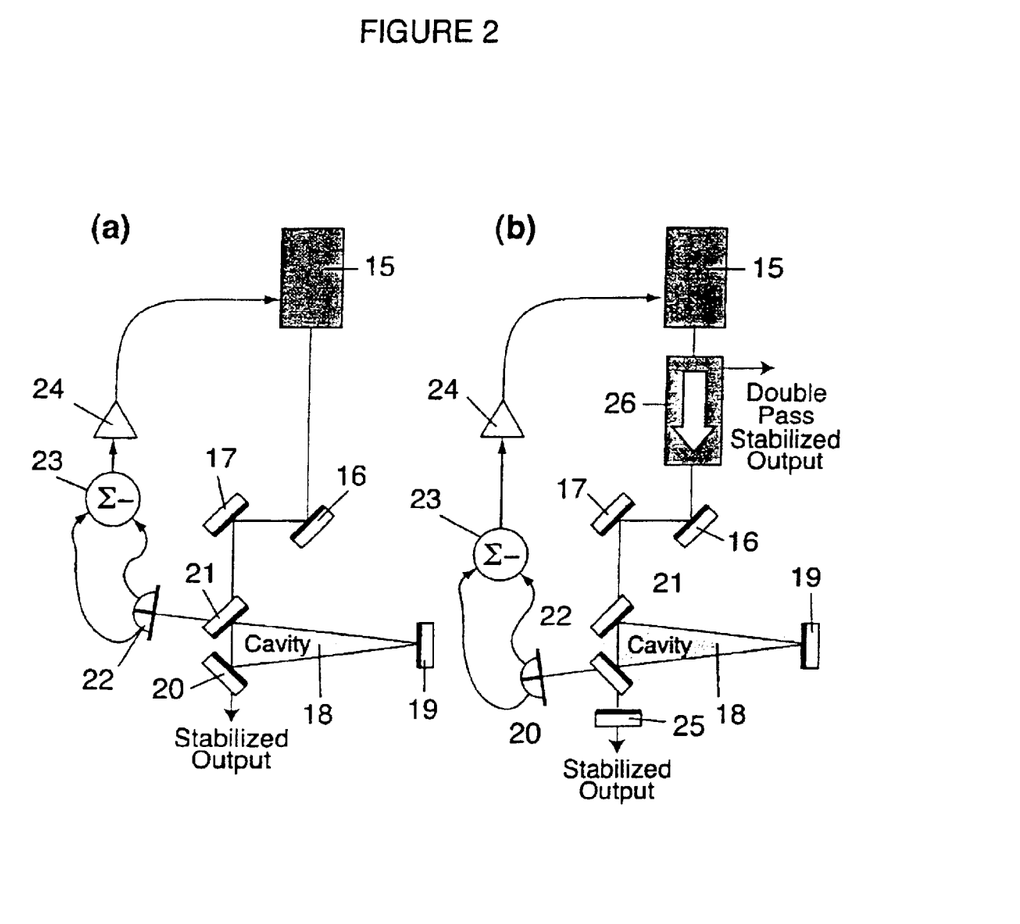
FIG. 2(a) is a schematic representation of frequency locking system according to a first embodiment of this invention.
FIG. 2(b) is a schematic representation of a frequency locking system according to a second embodiment of this invention.

The arrangement shown in FIG. 2(b) is generally similar to shown in FIG. 2(a) and the same reference numerals have been used to indicate corresponding features. In FIG. 2 double pass is achieved by the inclusion of a partial retroreflecting mirror 25 which reflects light, with a slight tilt, back through the cavity 18. The beam reflected on the second pass is partially transmitted by mirror 20 to provide the error signal to the split detector 22. An optical isolator 26 is included between the laser and the aligning mirror 16 to prevent reflected light returning to the laser and to provide the double pass stabilised output.

The arrangement shown in FIG. 2(a) suffers from the constraint that any input beam displacement causes an offset in the zero crossing point of the error signal. This sensitivity to displacement can be reduced by using an impedance matched cavity or by fibre coupling the input beam. Another method is the double pass configuration of FIG. 2(b) which minimises this problem by using the first pass through the cavity to spatially filter all higher order modes. In addition the beam path from the retro-reflector to the split detector can be made extremely short and mechanically stable.

The split photodetector uses a commercially available quadrant photodiode with the two quarters of each half added together. This forms a vertically split two element detector requiring a horizontal tilt to extract the error signal. The photodetector has both sum and difference outputs allowing both the power and error signal to be monitored independently.

Figure 3:
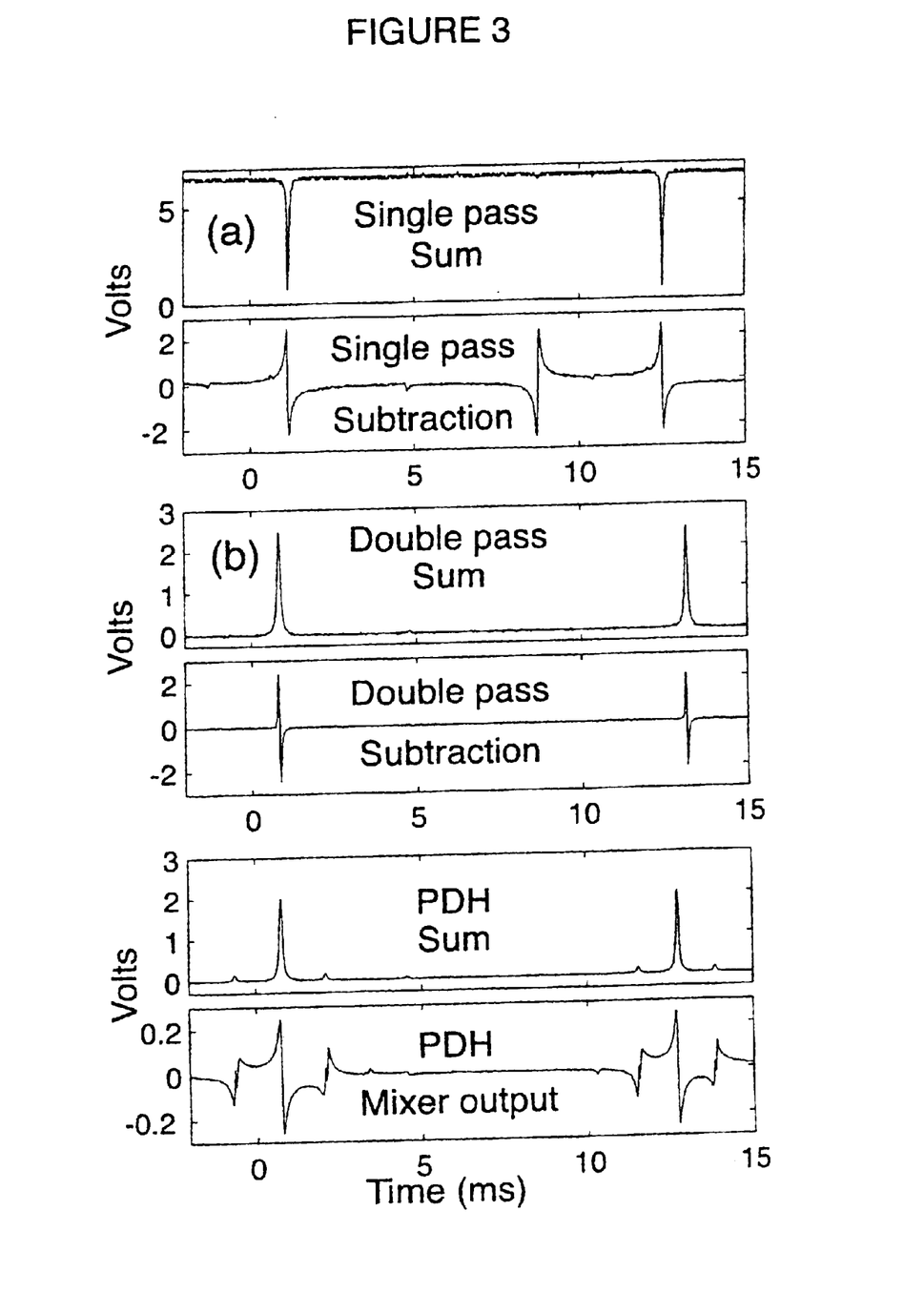
FIG. 3 is a graphical representation of the power and error signals for laser systems (a) with a frequency locking system according to the first embodiment of the invention, (b) with the frequency locking system according to the second embodiment of this invention and (c) with a frequency locking system according to the prior art PDH technique.

FIG. 3 shows experimental results as the cavity length is scanned using a PZT attached to one of the cavity mirrors. FIG. 3(a) shows the reflected power and error signal obtained using the single pass locking scheme of FIG. 2(a) as the cavity is scanned through a complete free spectral range (FSR). A large error signal (5V p–p) is obtained even with an extremely small misalignment (TEM01/ TEM00~1%). In FIG. 3(a) an error signal also appears as the small TEM01 mode passes through resonance with the fundamental now acting as a phase reference. As both these error signals result from the TEM00–TEM01 product they are both the same size, even though the TEM01 error signal has negligible light inside the cavity.

FIG. 3(b) shows the same results with the double pass locking scheme of FIG. 2(b). Due to the mode cleaner action of the first cavity pass, there is no error signal at the TEM01 resonance. In addition, the error signal drops to zero away from resonance somewhat faster than the single pass case due to the filtering effect of the first cavity pass.

For comparison FIG. 3(c) shows the transmitted power and error signal using the prior art PDH technique. The error signal is taken at the output of the demodulation mixer and demonstrates that the size of this signal (0.5V p–p) is at least an order of magnitude smaller than either of the locking techniques according to this invention. In this regard the size of the locking signal produced in accordance with the invention was deliberately reduced to allow use of the same frequency servo designed for PDH locking. Locking error signals of 25V p–p are readily achieved simply by increasing the beam tilt. This is technically difficult to achieve using the PDH technique due to the demodulation process.

Figure 4:
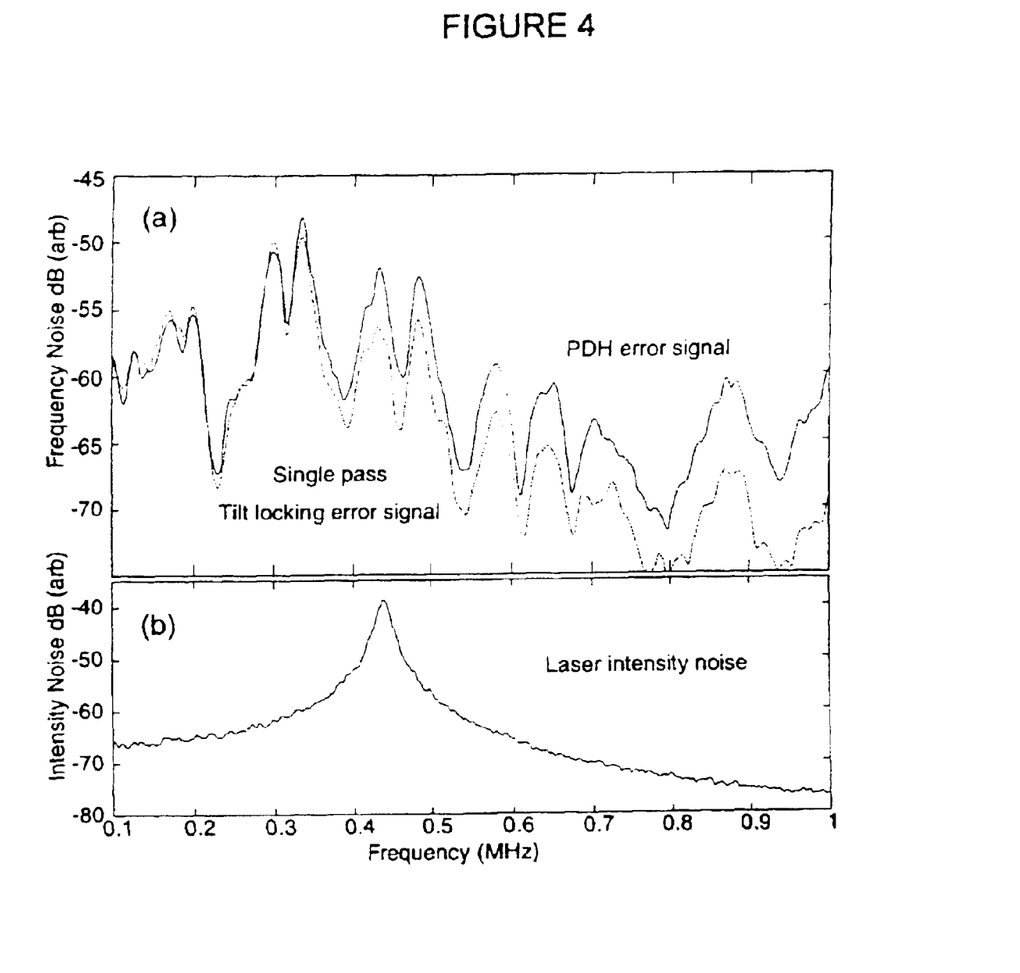
FIG. 4(a) graphically illustrates respective error signal frequency spectra for prior art PDH frequency locking (top trace) and the frequency locking system according to the second embodiment of this invention (lower trace)
FIG. 4(b) graphically illustrates the laser intensity noise over the same frequency range.

A well known feature of the PDH technique is its immunity to laser intensity noise. In order to verify similar immunity for this invention the frequency spectrum of the error signals of both techniques were compared. FIG. 4(a) shows the experimentally obtained frequency spectrum of the error signals from both PDH and single pass locking. The noise features shown on the PDH error signal are typical of the 50 mW Nd:YAG laser (Lightwave model 120) used in the experiments. The same features are clearly present on the locking error signal according to this invention (this spectrum is modified slightly by the photodetector frequency response rolling off at approximately 400 kHz). The intensity noise spectrum of the laser used, shown in FIG. 4(b), has a large single feature at 430 kHz; the laser relaxation oscillation. This feature is absent from both error signals indicating immeasurable intensity noise cross coupling for both PDH and locking according to this invention.

The locking system of this invention relies on two factors to achieve this intensity noise immunity: initial balancing of power on each half of the photodiode, and DC gain of the frequency servo. Balancing the power allows the subtracter circuit to remove laser intensity noise (down to the shot noise limit). However, even if the power is slightly imbalanced, the servo will adjust the lock position to recover power balance and thus intensity noise immunity. For both results in FIG. 4(a) the servo had a low frequency gain of greater than 100 dB.

Figure 5:
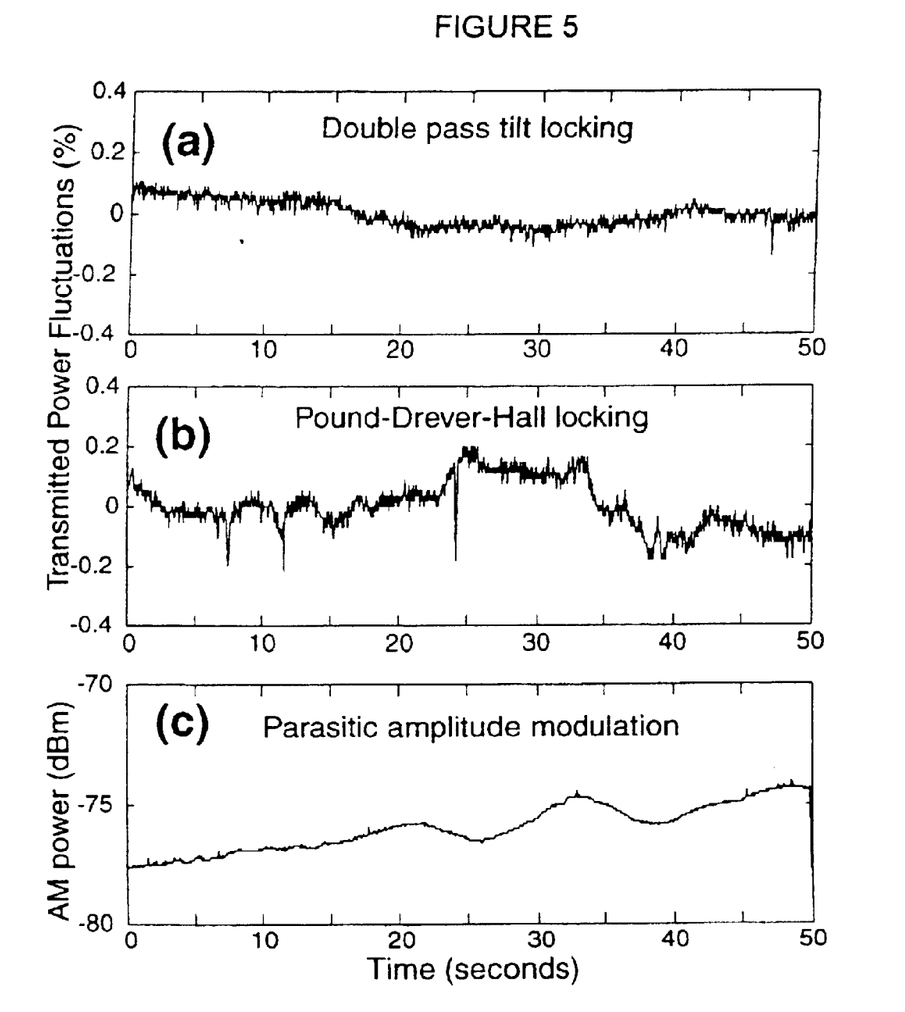
FIG. 5 graphically illustrates laser power transmission from fluctuations measured over 50 seconds for a laser (a) using a frequency locking system according to the second embodiment of this invention and (b) using prior art PDH frequency locking.

One of the benefits of the present invention is the potential for excellent long term stability. FIG. 5 plots thetransmitted power for both double pass locking and PDH locking over a period of 50 seconds. FIG. 5(a) shows the fluctuations of the power transmitted through a high finesse (f=4000) cavity using double pass locking. As can be seen, there is ≈0.1% change in power over this time scale. This drift is most likely due to drift in the output power of the laser. FIG. 5(b) shows the same measurement using the PDH system to lock the laser to the cavity. Over the same period the PDH system exhibits ≈0.3% transmitted power fluctuation, with considerably greater short term (~5 seconds) variation. The increased fluctuations are probably due to parasitic AM caused by temperature variations in the resonant phase modulator (New Focus model 4003). FIG. 5(c) shows the mixer output with the cavity blocked, giving an indication of the variation of parasitic AM over 50 seconds. From these power measurements it is clear that the locking system of this invention produced significantly less locking error over these time scales.

It will be apparent that the frequency locking system of this invention is a simple and inexpensive system requiring only a two element photodiode and several low frequency op-amps. This scheme provides excellent long term stability limited only by mechanical stability of the mirror/cavity/detector beam path. Mechanical stability of these components can be optimised by mounting all three elements on a single rigid spacer. For example, using this technique a laser linewidth of less than 7 Hz has been achieved. Long term stability is further improved due to the large error signal size, rendering servo noise and laser frequency drift insignificant. This combination of low cost, simplicity and excellent stability facilitates the use of misalignment locking in a broad range of applications.

The method of this invention is not restricted to passive optical cavities and can be used in connection with optical cavities that have some active medium within the cavity. For example a non linear crystal can be used in the optical cavity to produce a second harmonic frequency of the input beam. The method of this invention is used to lock the fundamental frequency to the resonance of the cavity to ensure maximum second harmonic generation efficiency. The method of this invention can also be used to generate the sub harmonic of the fundamental laser using an optical parametric amplifier or to injection lock a laser. In this latter example, this invention can be used to provide an error signal to lock the resonant frequency of the slave laser cavity to the master laser frequency or vice versa.

Figure 6:
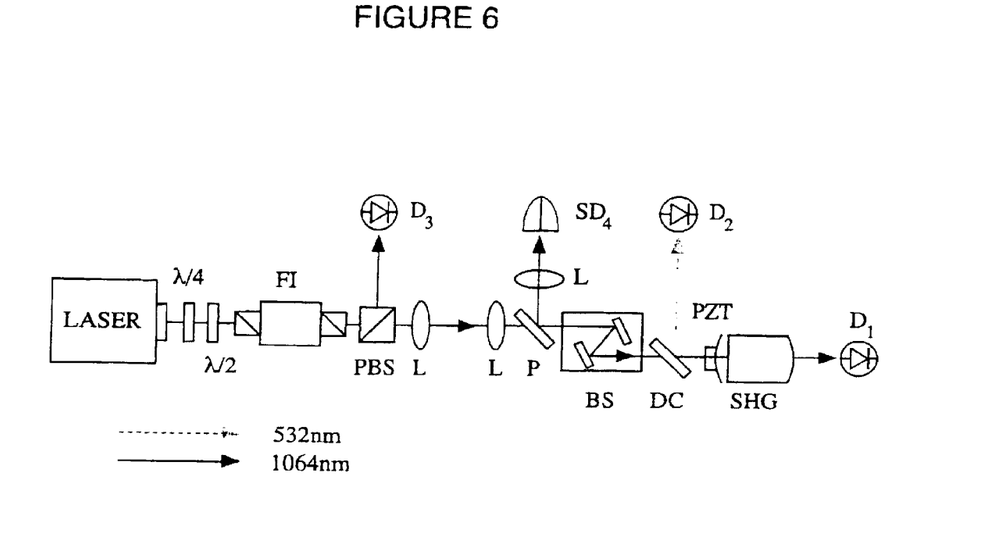
FIG. 6 is a schematic representation of a system according to the present invention for frequency locking a laser used for second harmonic generation.

FIG. 6 is a schematic illustration of an arrangement in which a non linear crystal generates a second harmonic frequency of 532 m, from a 1064 nm input beam using the present invention to lock the fundamental frequency to the resonance of the cavity. In the arrangement shown in FIG. 3 a MgO:LiNbO$_3$ crystal is used as a second harmonic generator SHG. The optical cavity is formed between the back surface of the generator SHG which is reflective at both wavelengths and an output coupler PZT. The crystal is pumped with light from a Nd:YAG laser operating at 1064 nm. A quarter and half waveplates λ4, λ2 are used to control the polarisation of the pump light and a Faraday isolation FI prevents retro reflection back to the laser. A polarising beam splitter PBS reflects a small amount of the pump light to a photodetector D3 to monitor the fundamental power. The remaining fundamental beam is focused into the SHG with a combination of two lenses L and aligned with a beam steerer BS. A dichroic beam splitter DC with high reflection at 532 nm is used to output the second harmonic light for detection by a diode 0.02. A small amount of tilt is introduced to the pump beam using the beam steerer BS just before the SHG cavity. This does not affect the SHG output as this is determined by the SHG cavity mode only. A pellicle P is positioned before the beam steerer to remove a small amount of the reflected fundamental radiation which is detected by a split detector SD$_4$. The error signal is produced from the output of split detector SD$_4$ in the same way as described above in relation to FIGS. 2(a) and 2(b) to provide a control signal for frequency control of the laser.

For the purpose of PHD locking comparison the electro-optic properties of the MgO:LiNbO$_3$ crystal were used to produce phase modulated side bands of the fundamental beam. The transmitted fundamental beam was detected by D1 and demodulated to produce the necessary error signal.

Figure 7:
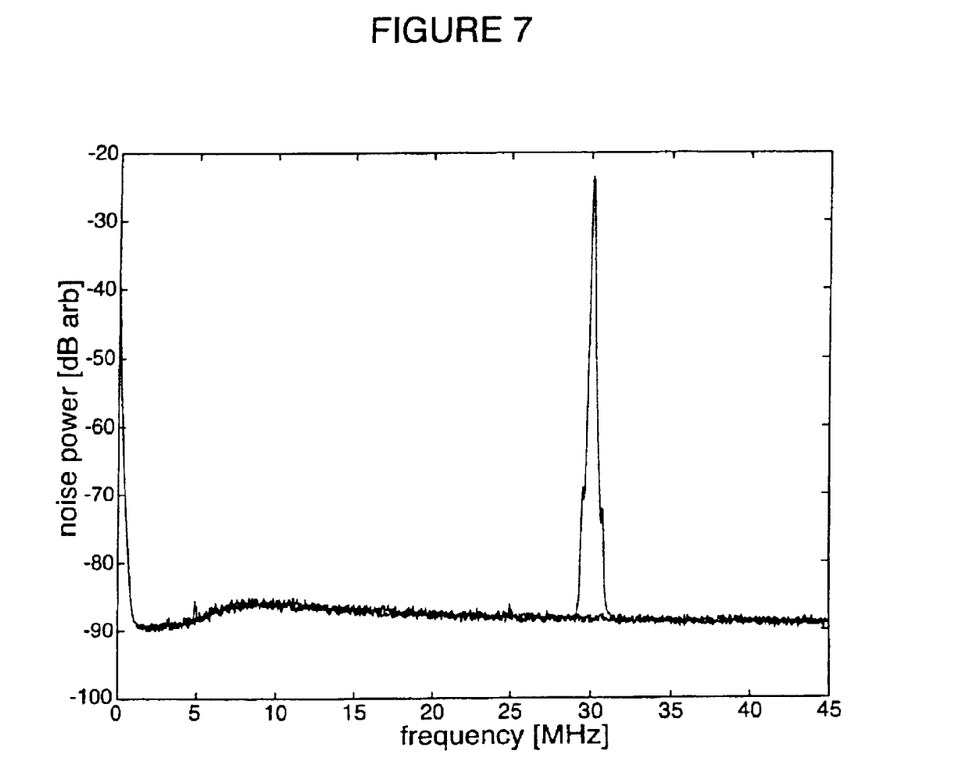
FIG. 7 is a illustration of second-harmonic spectra produced using apparatus shown in FIG. 6.

FIG. 7 illustrates the second harmonic amplitude spectra respectively obtained from PHD locking (line (a)) and tilt locking according to this invention (line (b)). The low frequency features present are due to the roll-off of the photodetector electronics and low frequency noise of the pump laser. The spike at 30 Mhz observable in the PHD locking spectrum is a result of the modulation of the crystal required to obtain an error signal. The tilt locking spectra on the other hand exhibits no such noise spots. Aside from the noise features associated with this locking modulation the two spectra are indistinguishable. Consequently tilt locking according to this invention is preferable for applications that rely on high spectral purity such as spectroscopy.

Figure 8:
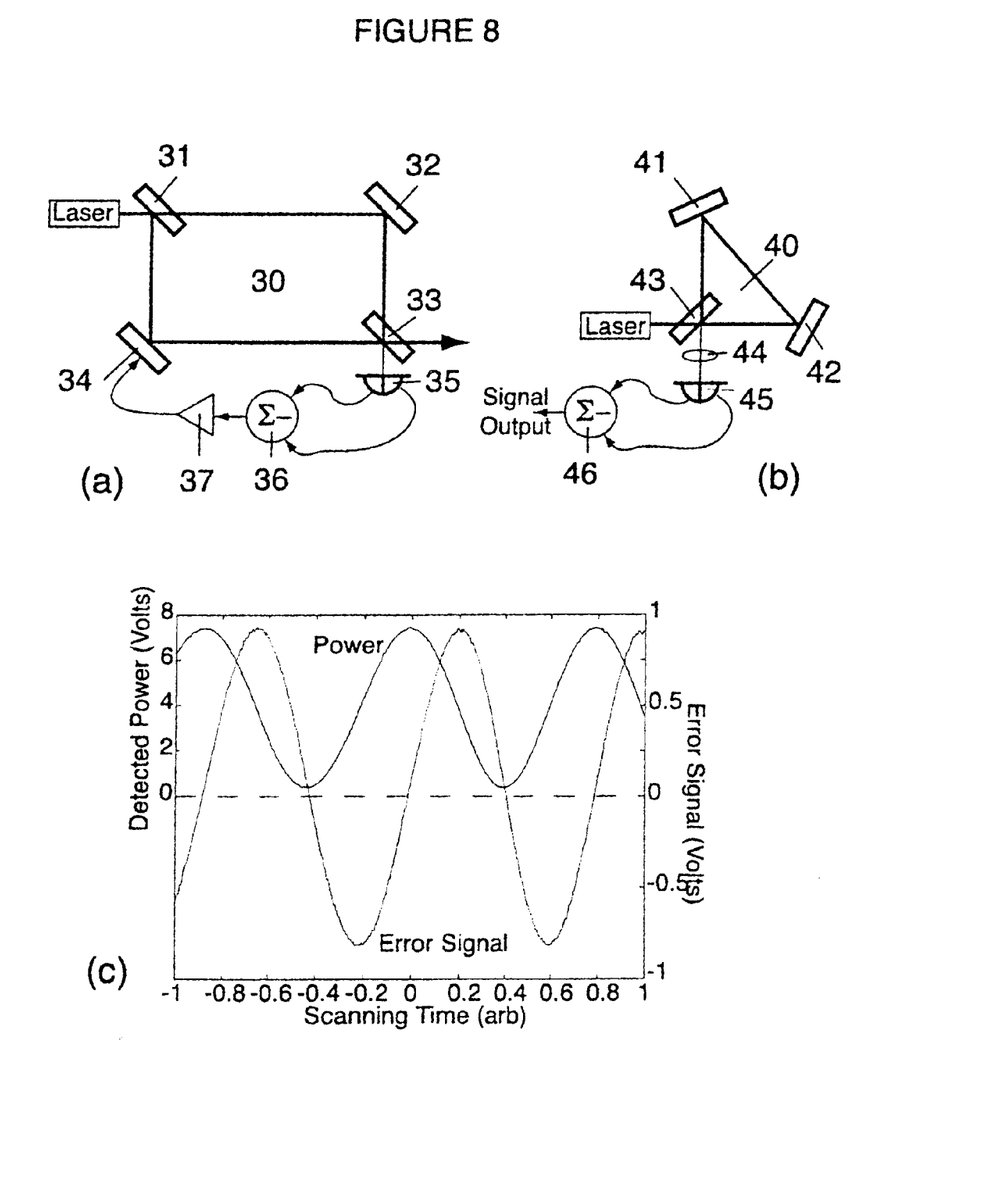
FIG. 8(a) is a schematic representation of this invention applied to a Mach-Zehnder interferometer.
FIG. 8(b) is a schematic representation of this invention applied to a SAGNAC interferometer.
FIG. 8(c) shows experimental results for the Mach-Zehnder configuration of FIG. 8(a)

The method of this invention is not restricted to optical cavities and can be applied to two beam interferometers. FIG. 8(a) shows a schematic of misalignment locking being applied to a Mach-Zehnder interferometer 30 formed in the known manner by mirrors 31, 32, 33, 34. The Mach-Zehnder 30 is aligned in such a way that the two interfering beams experience a relative tilt. Parts of the beams are reflected to a split photodetector 35. When operating around a dark fringe the subtraction from the two halves of the photodetector again yields a signal which is indicative of the phase component of the correctly aligned beam components. These are subtracted at 36 and amplified by amplifier 37 to provide a signal which adjusts the position of mirror 34.

FIG. 8(b) shows an alternative arrangement in which a Sagnac interferometer 40 formed by mirrors 41, 42, 43 is aligned such that the interfering beams have a relative offset error upon recombination. A lens 44 is used to convert this offset to tilt at a split photodetector 45 positioned at the focal plane of the lens 44. The subtracted output 46 of the photodetector can be used as a sensitive signal readout for the Sagnac interferometer.

FIG. 8(c) shows experimental results for the Mach-Zehnder configuration of FIG. 8(a). The two traces plotted are the total power detected and error signal, both measured by the same split photodiode. The subtracted photodetector output provides a zero crossing error signal at minimum and maximum fringe powers. Hence the interferometer can be locked to either a bright or dark fringe.

Figure 9:
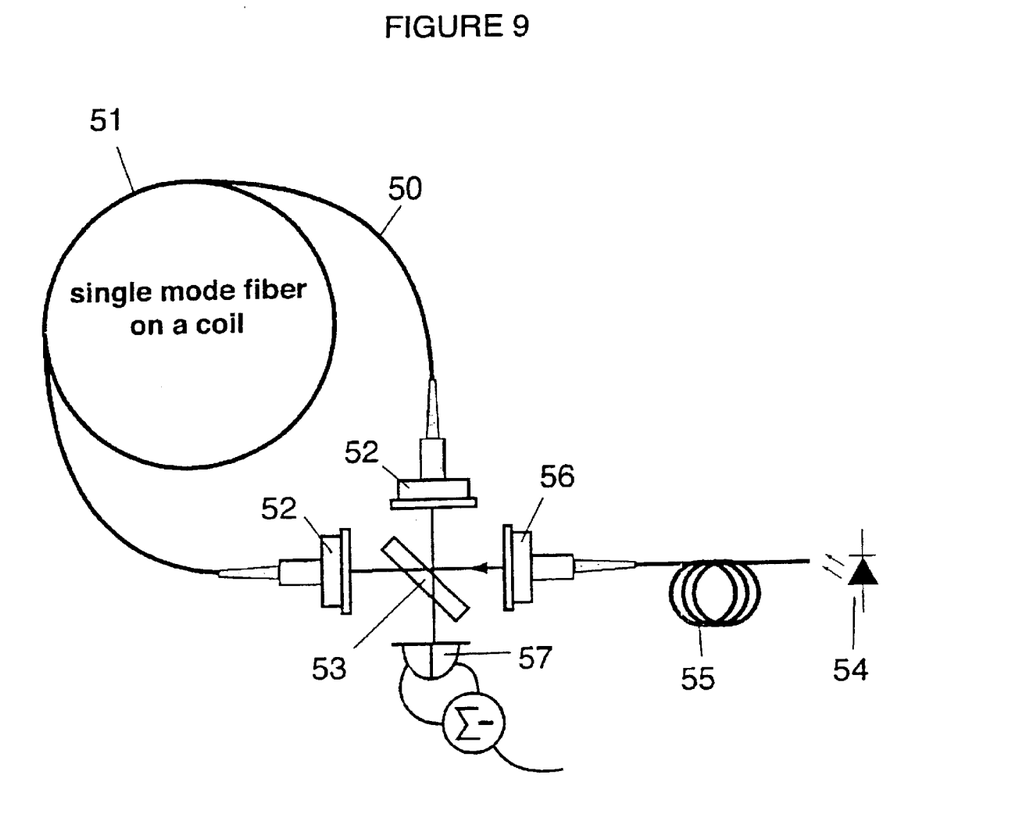
FIG. 9 is a schematic illustration of the present invention incorporated into a fibre SAGNAC interferometer.

FIG. 9 shows the schematic configuration of a fibre SAGNAC interferometer 50 incorporating the present invention. The interferometer 50 is formed by a single mode fibre 51 on a coil fitted with free space to fibre couplings 52 and a partially transmitting mirror 53. Input light from a light emitting diode 54 is transmitted by an optical fibre 55 and launched into the interferometer 50 from another free space to fibre coupling 56. A split detector 57 monitors a portion of the reflected output from the interferometer to produce a frequency control signal for the light emitting diode in the manner previously described for the other embodiments.

The foregoing describes only some embodiments of the invention and modifications can be made without departing from the scope of the invention.

What is claimed is:

1. A method for sensing and controlling the frequency of a laser with respect to an optical cavity including the steps of:

directing at least part of the laser beam to the optical cavity, introducing a misalignment in incident laser radiation associated with the laser beam to produce substantially only a resonant TEM00 mode and a non-resonant TEM01 mode, producing a single control beam resulting from modal interference of the TEM00 and TEM01 modes and detecting at least two spatially distinct portions of the control beam to produce at least two signals, each of the at least two signals indicative of the respective interference of the two correspondingly spatially distinct portions of the TEM00 mode with two correspondingly spatially distinct portions of the TEM01 mode, and producing an error signal indicative of the difference between the TEM00 mode frequency and the cavity resonance frequency from the two signals.

2. A method as claimed in claim 1 including the step of detecting two spatially distinct portions of said control beam of substantially equal size.

3. A method as claimed in claim 2 wherein each of said two spatially distinct portions each form about one half of the cross section of the control beam.

4. A method as claimed in any one of claims 1 to 3 wherein the misalignment of the incident laser radiation is achieved by tilting of the beam.

5. A method as claimed in any one of claims 1 to 3 wherein the misalignment of the incident laser radiation is achieved by offsetting of the beam.

6. A method as claimed in claim 5 wherein said control beam reflected from the cavity is focused onto a detector.

7. A method for sensing and controlling a two beam interferometer such that the relative path length of the two beams is fixed, including the steps of:

introducing a misalignment between the two beams to produce substantially only a TEM00 mode and a TEMO1 mode, producing a single control beam resulting from the modal interference of the TEM00 and TEM01 modes, detecting at least two spatially distinct portions of said control beam directed from the interferometer to produce at least two signals, each of the at least two signals indicative of the interference of the correspondingly spatially distinct portions of the TEM00 mode with the correspondingly spatially distinct portions of the TEMO1 mode, and producing an error signal indicative of the path length difference for the TEM00 modes from the two signals.

8. A method as claimed in claim 7 including the step of detecting two spatially distinct portions of said control beam of substantially equal size.

9. A method as claimed in claim 8 wherein each of said two spatially distinct portions each form about one half of the cross section of the control beam.

10. A method as claimed in any one of claims 7 to 9 wherein the misalignment between the two beams is achieved by a relative tilt.

11. A method as claimed in any one of claims 7 to 9 wherein the misalignment between the two beams is achieved by a relative offset.

12. A method as claimed in claim 11 wherein said control beam reflected from the cavity is focused onto a detector.

13. An optical system for controlling the frequency of a laser, said system including:

an optical cavity, means for directing laser radiation into said cavity, means for introducing a misalignment in the incident laser radiation to the cavity to produce substantially only a resonant TEM00 mode and a non-resonant TEM01 mode, means for producing a single control beam resulting from the modal interference of the TEM00 and TEM01 modes and means for detecting at least two spatially distinct portions of said control beam reflected from the cavity to produce at least two signals, each of the at least two signals indicative of the respective interference of the two correspondingly spatially distinct portions of the TEM00 mode with two correspondingly spatially distinct portions of the TEM01 mode, and means for producing an error signal indicative of the difference between the TEM00 mode frequency and the cavity resonance frequency from the two signals.

14. An optical system as claimed in claim 13 wherein said means for detecting detects two spatially distinct portions said control beam of substantially equal size.

15. An optical system as claimed in claim 14 wherein each of said two spatially distinct portions each form about one half of the cross section of the control beam.

16. An optical system claimed in any one of claims 13 to 15 wherein the misalignment of the incident beam tilts the beam.

17. An optical system as claimed in any one of claims 13 to 15 wherein the misalignment of the incident beam offsets of the beam.

18. An optical system method as claimed in claim 17 wherein the single beam reflected from the cavity is focused onto a detector by a lens.

19. A two beam interferometer including:

means for introducing a misalignment between the two beams to produce substantially only a TEM00 mode and a TEM01 mode, means for producing a single control beam resulting from the modal interference of the TEM00 and TEM01 modes;

means for detecting at least two spatially distinct portions of said single control beam directed from the interferometer and produce at least two signals, each of the at least two signals indicative of the interference of the correspondingly spatially distinct portions of the TEM00 mode with the correspondingly spatially distinct portions of the TEM01 mode, and a signal generator to produce from said two signals an error signal indicative of the path length difference for the TEM00 modes from the two signals.

20. A two beam interferometer as claimed in claim 19 wherein said means for detecting detects two spatially distinct portions of said control beam of substantially equal size.

21. A two beam interferometer as claimed in claim 20 wherein each of said two spatially distinct portions each form about one half of the cross section of the beam.

22. A two beam interferometer as claimed in any one of claims 19 to 21 wherein the misalignment between the two beams is a relative tilt.

23. A two beam interferometer as claimed in any one of claims 19 to 21 wherein the misalignment between the two beams is a relative offset.

24. A two beam interferometer as claimed in claim 23 wherein the control beam reflected from the cavity is focused onto a detector by a lens.

* * * * *